June 27, 1939.  O. K. BENCA ET AL  2,163,973
FISH TRAP
Filed Oct. 31, 1938   5 Sheets-Sheet 1

Inventors
Otto K. Benca
Ferdinand Benca
By Clarence A. O'Brien
and Hyman Berman
Attorneys

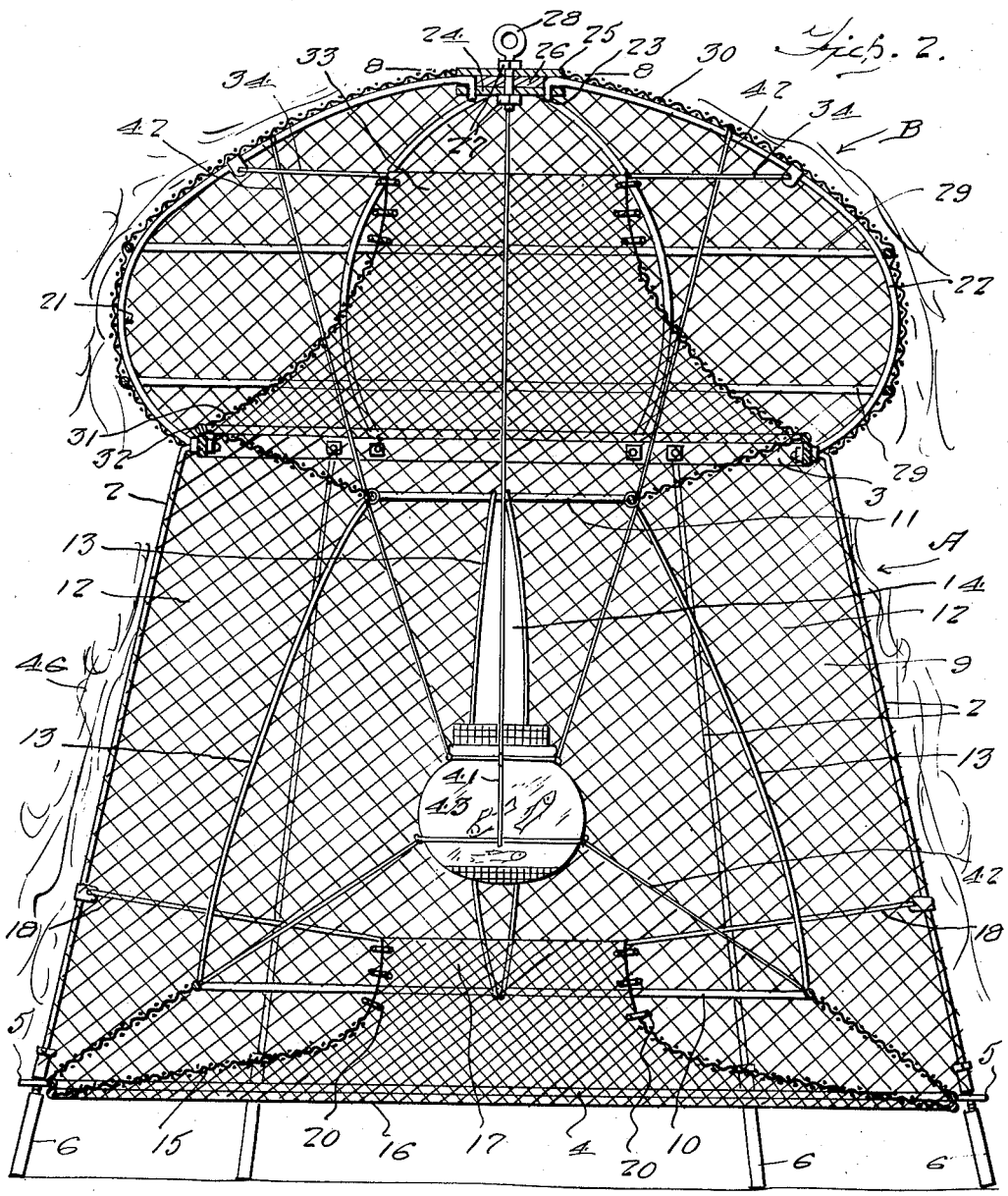

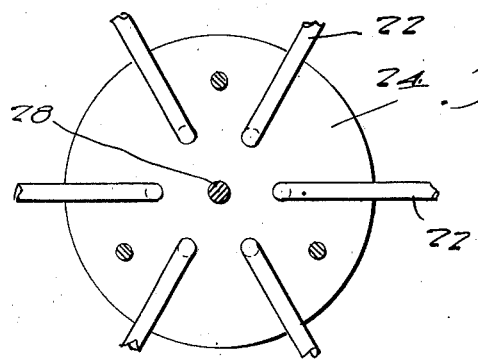

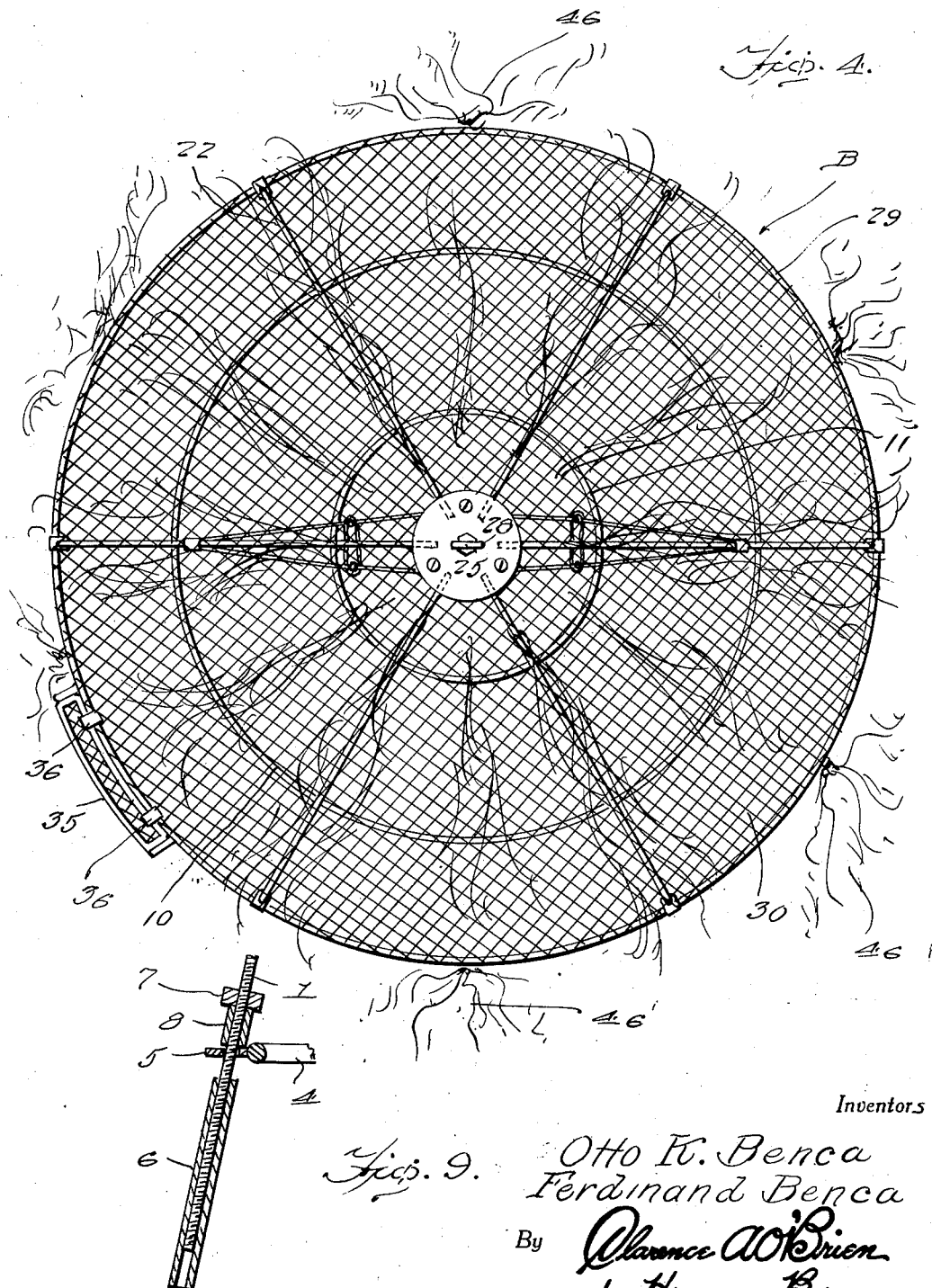

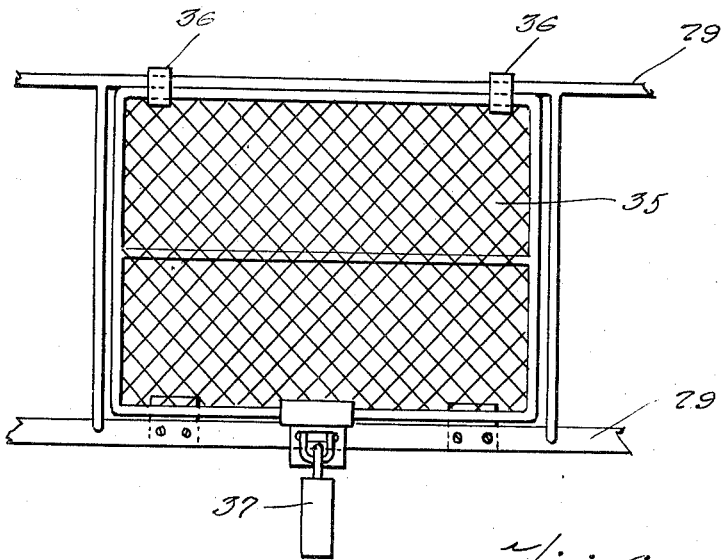
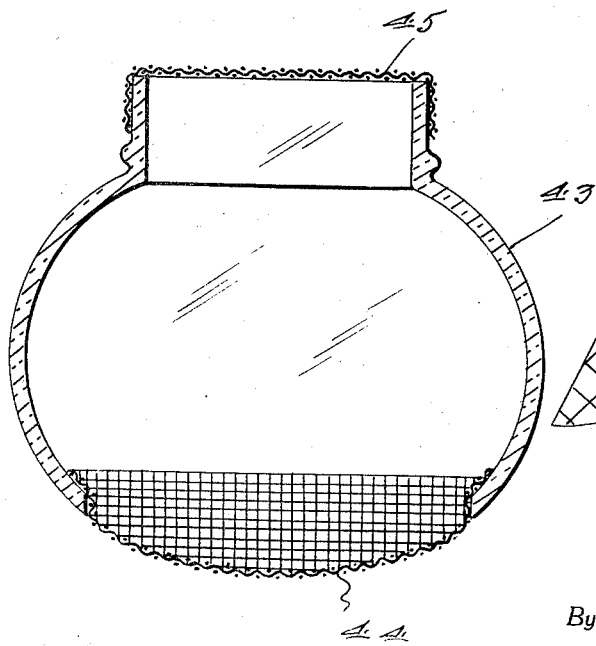
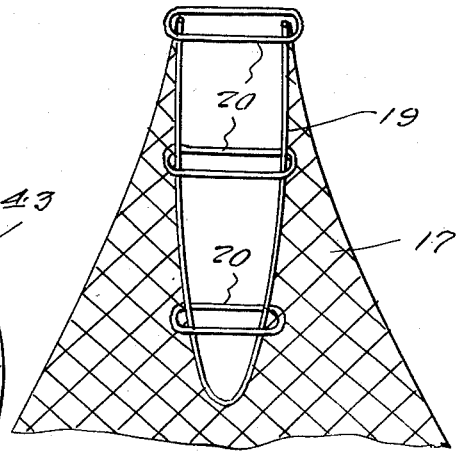

Patented June 27, 1939

2,163,973

UNITED STATES PATENT OFFICE 2,163,973

FISH TRAP

Otto K. Benca and Ferdinand Benca, Chicago, Ill.

Application October 31, 1938, Serial No. 238,014

4 Claims. (Cl. 43—100)

The present invention relates to new and useful improvements in fish traps and has for one of its important objects to provide, in a manner as hereinafter set forth, a device of this character embodying a construction which is such that the fish may enter from substantially any direction, including the bottom.

Another very important object of the invention is to provide a trap of the aforementioned character embodying a novel construction and arrangement whereby the fish caught therein will be kept alive, vigorous and uninjured until removed.

Still another important object of the invention is to provide a trap of the character described which is adapted to catch different sizes of fish, including minnows.

A still further important object of the invention is to provide a trap of the character set forth embodying a novel construction, arrangement and appearance whereby the fish will be lured thereinto.

Other objects of the invention are to provide a fish trap of the character set forth which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in vertical section through the trap.

Figure 3 is a horizontal sectional view, taken substantially on the line 3—3 of Fig. 1.

Figure 4 is a top plan view of the device.

Figure 5 is a detail view in elevation of the hinged door through which the fish are removed.

Figure 6 is a detail view in end elevation of one of the expansible entrance throats.

Figure 7 is a detail view in vertical section through the lure bowl.

Figure 8 is a horizontal sectional view, taken substantially on the line 8—8 of Fig. 2.

Figure 9 is a detail view in vertical section through one of the supporting legs.

Figure 1:
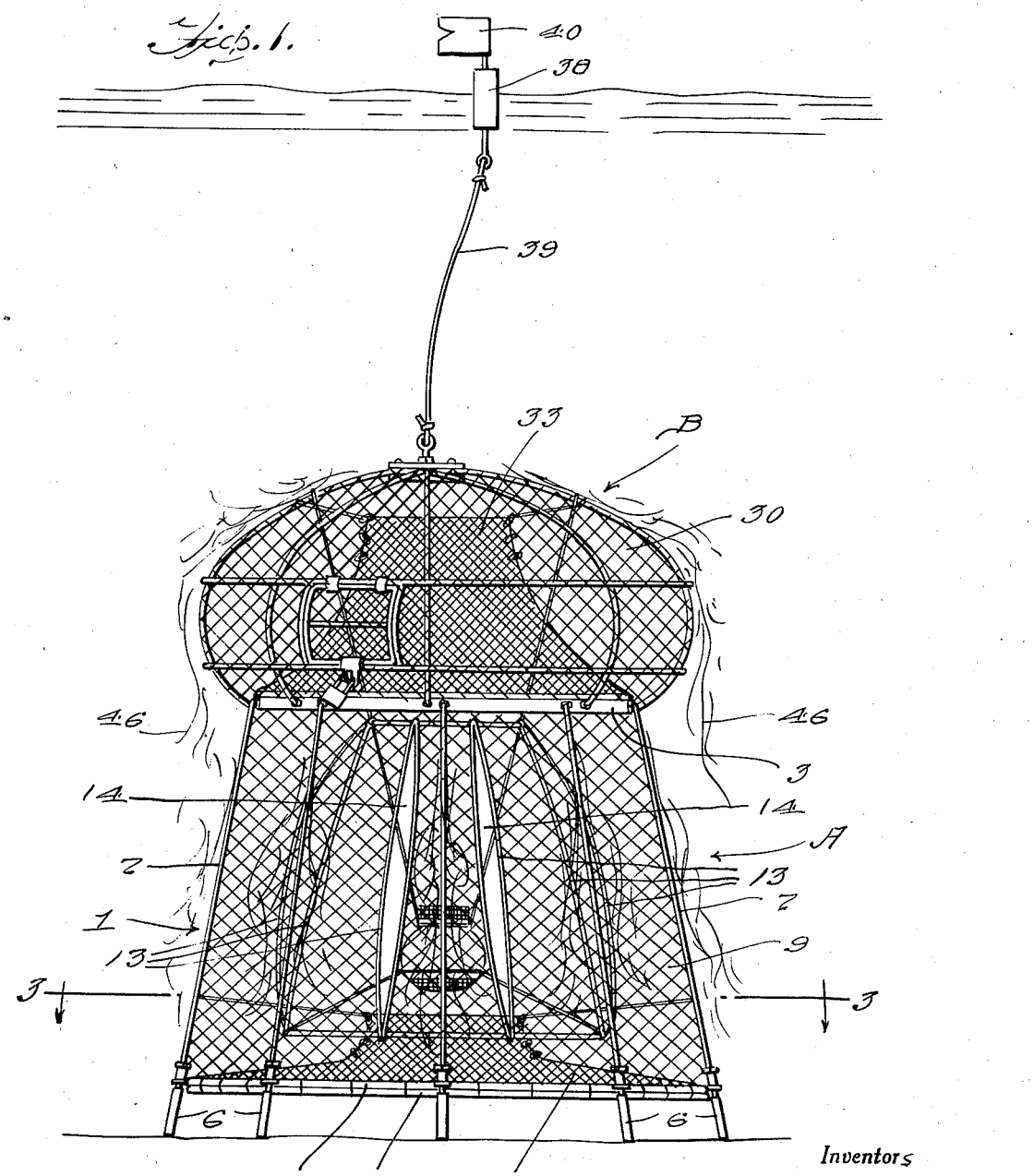
Figure 1 is a view in side elevation of an embodiment of the invention, showing the trap submerged in the water and in use.

Referring now to the drawings in detail, it will be seen that the embodiment of the invention which has been illustrated comprises what may be referred to as lower and upper compartments or chambers which are designated generally by the reference characters A and B, respectively. As illustrated to advantage in Fig. 1 of the drawings, the lower chamber A is tapered and the upper chamber B is substantially dome shaped.

The lower chamber A of the trap includes a frame structure of suitable rust proof metal which is designated generally by the reference numeral 1. The frame 1 includes spaced, inclined rods 2 having inwardly projecting upper end portions secured in a ring 3. Mounted on the lower portions of the rods 1 is a ring 4. As shown to advantage in Fig. 9 of the drawings, the lower end portions of the rods 1 are threaded and project below the ring 4. Mounted on the ring 4 are apertured ears 5 through which the rods 1 pass. Supporting legs 6 are threaded on the lower end portions of the rods 1. Nuts 7 are threaded on the rods 1 above the ears 5 and interposed between said nuts and said ears are sleeves 8. Thus, the ears 5 are clamped between the sleeves 8 and the supporting legs 6.

Mounted on the frame 1 is a foraminous cover 9 of suitable rust proof metal. Between the rods 2 the foramious cover 9 is drawn inwardly and secured in a taut condition to comparatively large and small lower and upper metalic rings 10 and 11, respectively, in a manner to provide a plurality of entrances, as shown to advantage in Fig. 3 of the drawings. These entrances are designated by the reference numeral 12. Substantially ovate openings 14 are provided at the inner ends of the entrances 12. The walls of the openings 14 are provided with reinforcements 13 extending between the rings 10 and 11.

The lower chamber A further includes a foraminous bottom 15 carried by a ring 16 at its periphery, said ring 16 being mounted on the ring 4. The bottom 15 is formed to provide a comparatively wide, substantially flat upwardly extending entrance throat 17 which is supported by a plurality of flexible rods or wires 18 from certain of the rods 1. Referring now to Fig. 6 of the drawings, it will be observed that the ends of the entrance throat 17 are slotted, as at 19, and connected by resilient elements 20 in a manner to permit expansion. The throat 17, of course, provides a non-return entrance to the lower chamber A of the trap and the resilient elements 20 permit the passage of comparatively large fish.

The upper chamber B of the trap comprises a frame structure which is designated generally by the reference numeral 21. The frame structure 21 includes a plurality of curved rods 22 having their lower ends secured to the ring 3. At their upper ends, the rods 22 terminate in downturned hooks 23 which are engaged in apertures which are provided therefor in a metallic plate 24. The hooks 23 are retained in the plate 24 by an upper plate 25. The spacer 26 is provided between the plates 24 and 25. The elements 24, 25 and 26 are clamped together through the medium of nuts 27 on an eye bolt 28. The frame 21 further includes a plurality of rings 29 which are fixed on the rods 22. Mounted on the frame 21 is a foraminous cover 30 of suitable rust proof metal.

The upper chamber B of the trap further comprises a substantially conical foraminous bottom 31 secured, at its periphery, to a ring 32 to which the upper end of the foraminous cover 9 of the lower chamber A is also secured. The ring 32 is mounted on the ring 3. The foraminous bottom 31 of the upper chamber B is formed to provide an upstanding, comparatively wide and substantially flat entrance throat 33 which is substantially similar in construction and operation to the entrance throat 17 of the lower chamber A. The entrance throat 33 is supported by rods 34 from certain of the frame rods 22.

Referring now to Figs. 1 and 5 of the drawings, it will be seen that the reference numeral 35 designates a foraminous door which is hingedly mounted for swinging movement in a vertical plane on one of the rings 29 of the frame structure 21, as at 36. A suitable lock 37 is provided for securing the door 35 in closed position. The reference numeral 38 (see Fig. 1) designates a buoy which is connected by a cable 39 or the like to the eye bolt 28. Mounted on the buoy 38 is a flag 40.

The reference numeral 41 (see Fig. 2) designates a frame which is mounted in the lower chamber A of the trap through the medium of rods 42. Mounted in the frame 41 is a transparent bowl 43 for the reception of live minnows. Referring now to Fig. 7 of the drawings, it will be observed that the bowl 43 comprises a foraminous bottom 44 and is provided with a cap or cover 45 of similar material. The trap is camouflaged by suitable natural or artificial marine growth 46 draped over the upper and lower portions thereof.

It is thought that the manner in which the trap functions will be readily apparent from a consideration of the foregoing. Fish, attracted by the live minnows in the transparent bowl 43, approach the camouflaged trap and enter the lower chamber A thereof through any of the long, narrow openings 14 or the throat 17 in the bottom 15. From the chamber A, the fish pass upwardly through the throat 33 into the upper chamber B of the trap where they are held in captivity. It will be seen that the construction and arrangement is such that the fish thus caught will be kept alive and uninjured until removed. To empty the trap it is only necessary to raise it from the water through the medium of the cable 39 and open the door 35 to permit the removal of the fish from the chamber B, after which the trap may be immediately lowered again. The foraminous bottom 44 of the bowl 43 permits the water to empty from said bowl thereby decreasing the weight when the trap is raised out of the water.

It is believed that the many advantages of a fish trap constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed. For example, should the trap be made of a size for catching minnows or very small fish, Cellophane or similar transparent material may be substituted for the foraminous elements 9 and 30.

What is claimed is:

1. A fish trap of the class described comprising a foraminous lower chamber and a foraminous upper chamber mounted thereon, said lower chamber having an entrance opening in its bottom and a plurality of entrance openings in its walls, a transparent receptacle suspended in the lower chamber for the reception of live minnows, and a non-return passage for the fish establishing communication between the upper and lower chambers.

2. A fish trap comprising a tapered lower chamber and a substantially dome-shaped upper chamber mounted thereon, the lower chamber having a plurality of entrance openings therein, and a non-return passage for the fish between the upper and lower chambers, said non-return passage comprising a foraminous cone mounted in the lower portion of the upper chamber and including an upstanding, comparatively wide, flat throat portion having slotted ends, and resilient elements connecting the side walls of the slots for permitting expansion of the throat.

3. A fish trap of the class described comprising a substantially tapered lower chamber and a substantially dome shaped upper chamber mounted thereon, said lower chamber including a frame structure, a foraminous cover mounted on said frame structure having a plurality of vertically elongated entrance openings therein, the lower chamber further including a foraminous bottom comprising an upstanding, comparatively wide, substantially flat throat portion having slots in its ends, resilient elements connecting the vertical walls of the slots, and a transparent container in the lower chamber for the reception of minnows.

4. A fish trap of the class described comprising a substantially tapered lower chamber and a substantially dome shaped upper chamber mounted thereon, said lower chamber including a frame structure, a foraminous cover mounted on said frame structure having a plurality of vertically elongated entrance openings therein, the lower chamber further including a foraminous bottom comprising an upstanding, comparatively wide, substantially flat throat portion having slots in its ends, resilient elements connecting the vertical walls of the slots, and a transparent container in the lower chamber for the reception of minnows, the upper chamber including a frame structure mounted on the first named frame structure, a foraminous cover on the second named frame structure, and a non-return passage for the fish establishing communication between the upper chamber and the lower chamber.

OTTO K. BENCA.
FERDINAND BENCA.